United States Patent
Paul

(10) Patent No.: US 9,828,909 B2
(45) Date of Patent: Nov. 28, 2017

(54) CONNECTING ROD AND INTERNAL COMBUSTION ENGINE

(71) Applicant: Dr. Ing. h.c. F. Porsche Aktiengesellschaft, Stuttgart (DE)

(72) Inventor: Michael Paul, Weissach (DE)

(73) Assignee: DR.ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 90 days.

(21) Appl. No.: 15/056,023

(22) Filed: Feb. 29, 2016

(65) Prior Publication Data
US 2016/0258354 A1    Sep. 8, 2016

(30) Foreign Application Priority Data
Mar. 5, 2015    (DE) .................. 10 2015 103 205

(51) Int. Cl.
   *F02B 75/04*    (2006.01)
   *F16C 7/06*    (2006.01)
   *F16C 23/10*    (2006.01)

(52) U.S. Cl.
   CPC .............. *F02B 75/045* (2013.01); *F16C 7/06* (2013.01); *F16C 23/10* (2013.01)

(58) Field of Classification Search
   CPC ........ F02B 75/045; F02B 75/32; F02B 41/04; F16C 7/023; F16C 7/06; F16C 9/04; A01B 59/004
   (Continued)

(56) References Cited

U.S. PATENT DOCUMENTS 3,667,433 A    6/1972    Isley
5,146,879 A *  9/1992    Kume ............... F01M 1/06
                                          123/48 B
(Continued)

FOREIGN PATENT DOCUMENTS

DE    101 08 461        8/2001
DE    102005055199 A1   5/2007
(Continued)

OTHER PUBLICATIONS

Gerrman Office Action dated Jan. 4, 2017.
German Search Report dated Oct. 6, 2015.

*Primary Examiner* — Hung Q Nguyen
*Assistant Examiner* — Brian P Monahon
(74) *Attorney, Agent, or Firm* — Gerald E. Hespos; Michael J. Porco; Matthew T. Hespos

(57) ABSTRACT

A connecting rod (10) has a crankpin bearing eye (11) attached to a crankshaft (38) and a connecting-rod bearing eye (12) attached to a piston. An eccentric adjustment device (13) adjusts an effective connecting rod length and has eccentric rods (15, 16) that engage a lever (14) of the eccentric adjustment device (13). Each eccentric rod (15, 16) has a piston (20, 21) guided in a hydraulic chamber (22, 23). The hydraulic chambers (22, 23) can be charged with hydraulic oil from first hydraulic lines (41) that lead to the crankpin bearing eye (11) and second hydraulic oil lines (24, 25) that lead from the crankpin bearing eye (11). Check valves (26, 27) prevent a backflow of hydraulic oil back into the second hydraulic lines (24, 25). At least one filter prevents an ingress of contaminants from the crankshaft into the hydraulic chambers (22, 23) via the hydraulic oil.

7 Claims, 2 Drawing Sheets

(58) Field of Classification Search
USPC .................. 123/197.4, 197.3; 74/586, 587
See application file for complete search history.

(56) References Cited

U.S. PATENT DOCUMENTS

| | | | | |
|---|---|---|---|---|
| 6,497,203 | B1* | 12/2002 | Rao ................ | F02B 75/045 |
| | | | | 123/48 B |
| 6,736,091 | B1* | 5/2004 | Tibbles ............ | F02B 75/045 |
| | | | | 123/78 E |
| 7,434,548 | B2* | 10/2008 | Takahashi ........ | F02B 75/044 |
| | | | | 123/48 B |
| 8,627,660 | B2* | 1/2014 | Ito .................. | F02D 41/0007 |
| | | | | 123/568.11 |
| 2009/0056667 | A1* | 3/2009 | Devine ............ | F02B 41/06 |
| | | | | 123/197.4 |
| 2010/0046869 | A1* | 2/2010 | Matsuyama ...... | F16C 9/02 |
| | | | | 384/288 |
| 2013/0327729 | A1* | 12/2013 | Apostolides ..... | F17D 1/14 |
| | | | | 210/805 |
| 2015/0059683 | A1* | 3/2015 | Schulze .......... | F02B 75/045 |
| | | | | 123/197.3 |
| 2015/0075497 | A1* | 3/2015 | Hutzelmann ..... | F02B 75/044 |
| | | | | 123/48 A |
| 2015/0152794 | A1* | 6/2015 | Paul ............... | F02D 15/02 |
| | | | | 123/48 R |

FOREIGN PATENT DOCUMENTS

| | | |
|---|---|---|
| DE | 10 2010 016 037 | 9/2011 |
| EP | 0 438 121 | 7/1991 |
| JP | 58030019 U1 | 8/1956 |
| JP | 63108538 A | 7/1988 |
| JP | 2010014046 A | 1/2010 |
| JP | 2013130161 A | 7/2013 |
| JP | 2015014286 A | 1/2015 |

* cited by examiner

CONNECTING ROD AND INTERNAL COMBUSTION ENGINE

CROSS REFERENCE TO RELATED APPLICATION

This application claims priority under 35 USC 119 to German Patent Appl. No. 10 2015 103 205.8 filed on Mar. 5, 2015, the entire disclosure of which is incorporated herein by reference.

BACKGROUND

1. Field of the Invention

The invention relates to a connecting rod for an internal combustion engine, and to an internal combustion engine.

2. Description of the Related Art

DE 10 2010 016 037 A1 and FIG. 1 and show a connecting rod 10 of an internal combustion engine having an adjustable compression ratio. The connecting rod 10 has a crankpin bearing eye 11 and a connecting-rod bearing eye 12. The crankpin bearing eye 11 attaches the connecting rod 10 to a crankshaft (not shown in FIG. 1) and the connecting-rod bearing eye 12 attaches the connecting rod 10 to a cylinder piston (not shown in FIG. 1) of the internal combustion engine. The connecting rod 10 has an eccentric adjustment device 13 with an eccentric (not shown in FIG. 1), an eccentric lever 14 and eccentric rods 15, 16. The eccentric lever 14 has a bore that is arranged eccentrically with respect to a center point 17 of the connecting-rod bearing eye 12 and that has a center point 18. The bore in the eccentric lever 14 receives the eccentric and a bore in the eccentric receives a piston pin. The eccentric adjustment device 13 enables adjustment of an effective connecting rod length $l_{eff}$, where the connecting rod length is to be understood to mean the spacing of the center point 18 of the bore in the eccentric lever 14 from a center point 19 of the crankpin bearing eye 11. The eccentric rods 15, 16 can be moved to rotate the eccentric body 14 and thus change the effective connecting rod length $l_{eff}$. Each eccentric rod 15, 16 has a piston 20, 21 that is guided displaceably in a hydraulic chamber 22, 23. A hydraulic pressure acts exists in the hydraulic chambers 22, 23 and on the pistons 20, 21 assigned to the eccentric rods 15, 16 so that movement of the eccentric rods 15, 16 is possible or not possible depending on the amount of oil in the hydraulic chambers.

The adjustment of the eccentric adjustment device 13 is initiated by the action of inertia and load forces of the internal combustion engine that act on the eccentric adjustment device 13 during a work stroke of the internal combustion engine. The directions of action of the forces that act on the eccentric adjustment device 13 change continuously during a work stroke. The adjustment movement is assisted by the pistons 20, 21 that are loaded with hydraulic oil and act on the eccentric rods 15, 16. The pistons 20, 21 prevent a restoring movement of the eccentric adjusting device 13 on account of varying directions of the forces that act on the eccentric adjustment device 13. The eccentric rods 15, 16 that interact with the pistons 20, 21 are attached to the eccentric body 14 on both sides. The hydraulic chambers 22 and 23, in which the pistons 20, 21 are guided, can be charged with hydraulic oil from the crankpin bearing eye 11 via hydraulic oil lines 24 and 25. Check valves 26 and 27 prevent a return flow of the hydraulic oil from the hydraulic chambers 23 and 24 back into the hydraulic lines 24 and 25. A switchover valve 29 is received in a bore 28 of the connecting rod 10. The switching position of the switchover valve 29 determines which of the hydraulic chambers 22 and 23 is filled with hydraulic oil and which of the hydraulic chambers 22 and 23 is evacuated, and the adjustment direction or direction of rotation of the eccentric adjustment device 13 is dependent on this switching. The hydraulic chambers 22 and 23 are in contact via fluid lines 30 and 31 with the bore 28 that receives the switchover valve 29. An actuation means 32, a spring device 33 and a control piston 34 of the switchover valve 29 are shown schematically in FIG. 1, and the function of these components of the switchover valve 29 is known from DE 10 2010 016 037 A1.

As described above, the hydraulic oil that acts on the pistons 20, 21 that are guided in the hydraulic chambers 22, 23 is fed to the hydraulic chambers 22, 23 from the crankpin bearing eye 11 via hydraulic lines 24 and 25. The connecting rod 10 is engaged by the crankpin bearing eye 11 on the crankshaft (not shown in FIG. 1) so that a crankshaft bearing journal of a connecting rod bearing shell 35 is arranged between the crankshaft and the crankpin bearing eye 11.

Hydraulic oil can be fed from the crankpin bearing eye 11 of the connecting rod 10 to the hydraulic chambers 22 and 23 via the hydraulic lines 24 and 25 that are integrated into the connecting rod 10 and is conducted in the direction of the crankpin bearing eye via first hydraulic lines integrated into the crankshaft. There is the risk of contaminants passing from the crankshaft into the hydraulic chambers, and thus into the connecting rod, via the hydraulic oil. These contaminants could impair the functioning of the check valves of the eccentric adjustment device and the switchover valve. In the extreme case, the eccentric adjustment device and the connecting rod may fail.

DE 101 08 461 B4 discloses a crankshaft bearing arrangement for an internal combustion engine having an adjustable compression ratio. The crankshaft bearing arrangement has the crankshaft mounted in eccentric rings, and an oil distribution groove is provided on the outer circumferential face of the eccentric ring. Oil can pass in the direction of the oil distribution groove via an oil feed channel in the engine housing.

It is an object of the invention to provide an improved internal combustion engine and an improved connecting rod.

SUMMARY

The invention relates to a connecting rod and an engine that has at least one filter element that prevents a flow of contaminants from the crankshaft into the hydraulic chambers via the hydraulic oil. Thus, contaminants cannot pass from the crankshaft into the hydraulic chambers and into the connecting rod via the hydraulic oil. In this way, the functional reliability of the connecting rod, or of an internal combustion engine that comprises the connecting rod, can be increased.

The filter element may be integrated into a first hydraulic line of the crankshaft. More particularly, a filter element may be integrated into a hydraulic line of the crankshaft for each connecting rod and protects the connecting rod against contaminants from an engine oil circuit in an effective manner. Hydraulic lines in the region of the crankshaft have a relatively large diameter, and filter elements integrated into said hydraulic lines can have large filter surfaces. Correspondingly filters accordingly have a large storage volume for the contaminants to be filtered out of the hydraulic oil. Furthermore, filter elements integrated into the crankshaft can exhibit low pressure losses.

Each check valve may have a filter element, so that a filter element may be incorporated into each of the hydraulic chambers of the connecting rod or into each of the second hydraulic lines of the connecting rod to prevent an ingress of contaminants into the hydraulic chambers of the connecting rod. Positioning the filter elements immediately upstream of the hydraulic chambers or of the check valves provides protection in an effective manner against contaminants from the hydraulic oil.

Exemplary embodiments of the invention will be discussed in more detail on the basis of the drawing, without being restricted thereto.

DETAILED DESCRIPTION

Figure 1:
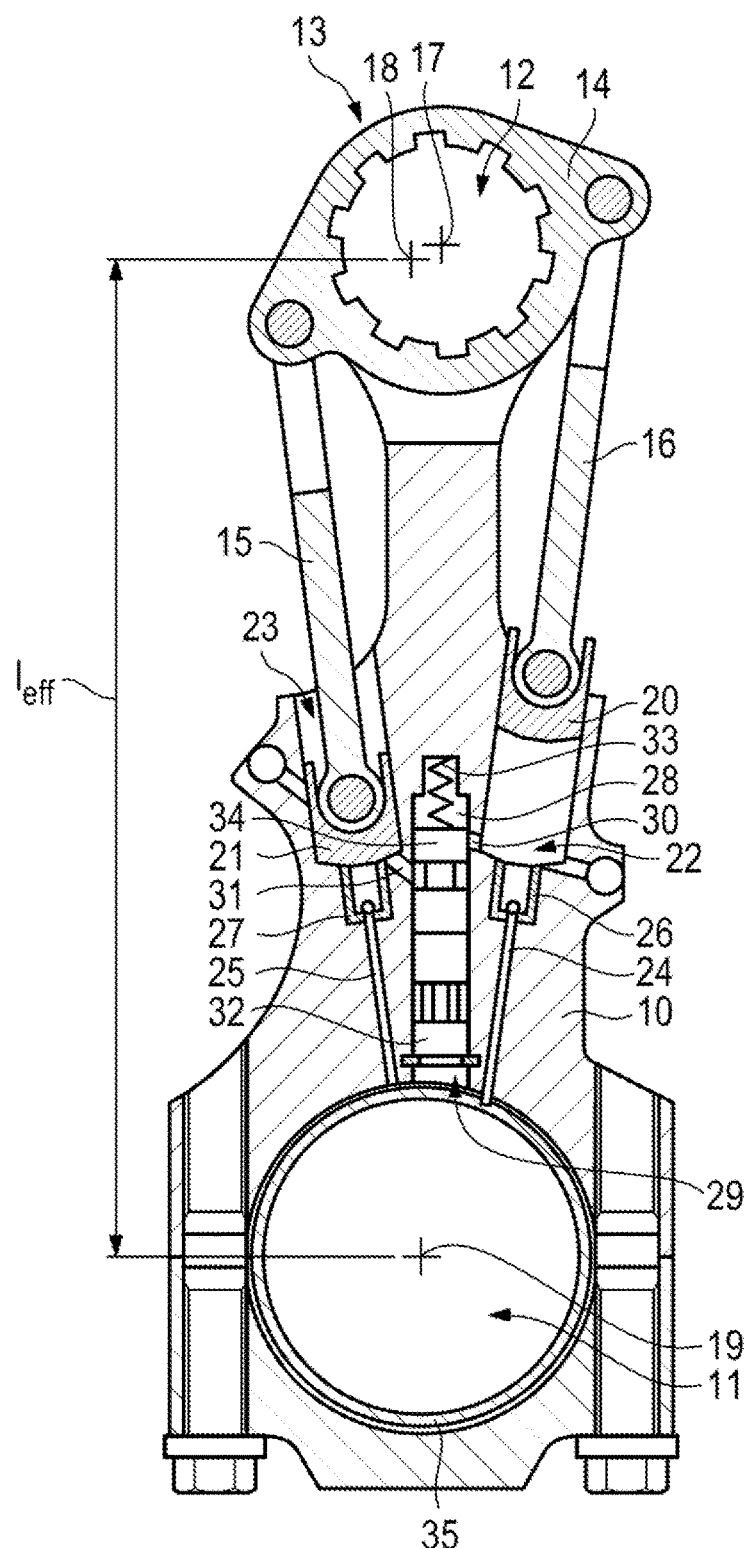
FIG. 1 shows a prior art connecting rod of an internal combustion engine with adjustable compression ratio.

An internal combustion engine with an adjustable compression ratio has at least one, preferably several, cylinders. Each cylinder has a piston that is coupled via a connecting rod 10 to a crankshaft of the internal combustion engine. Each connecting rod 10 has a connecting-rod bearing eye 12 at one end and a crankpin bearing eye 11 at an opposite end. The crankpin bearing eye 11 engages on a crankshaft bearing journal of the crankshaft in such a way that a connecting rod bearing shell is positioned between the crankshaft bearing journal and the crankpin bearing eye 11 and so a lubricating oil film can be built up between the connecting rod bearing shell and the crankshaft bearing journal.

An internal combustion engine having an adjustable compression ratio has an eccentric adjustment device 13 in the region of each connecting rod 10 for adjusting the effective length of the respective connecting rod 10. The eccentric adjustment device 13 has an eccentric, an eccentric lever 14 and eccentric rods 15, 16 that can be moved in a manner dependent on a hydraulic pressure prevailing in hydraulic chambers 22, 23 that interact with the eccentric rods 15, 16 for adjusting the compression ratio. The hydraulic chambers 22, 23 that interact with the eccentric rods 15, 16 can be supplied with hydraulic oil from the crankshaft and from the crankpin bearing eye 11 of the respective connecting rod 10. The adjustment of the eccentric adjustment device is initiated by the action of inertia and load forces of the internal combustion engine.

A filter element interacts with each connecting rod 10 to prevent an ingress of contaminants from the crankshaft into the hydraulic chambers 22, 23 via the hydraulic oil.

Figure 2:
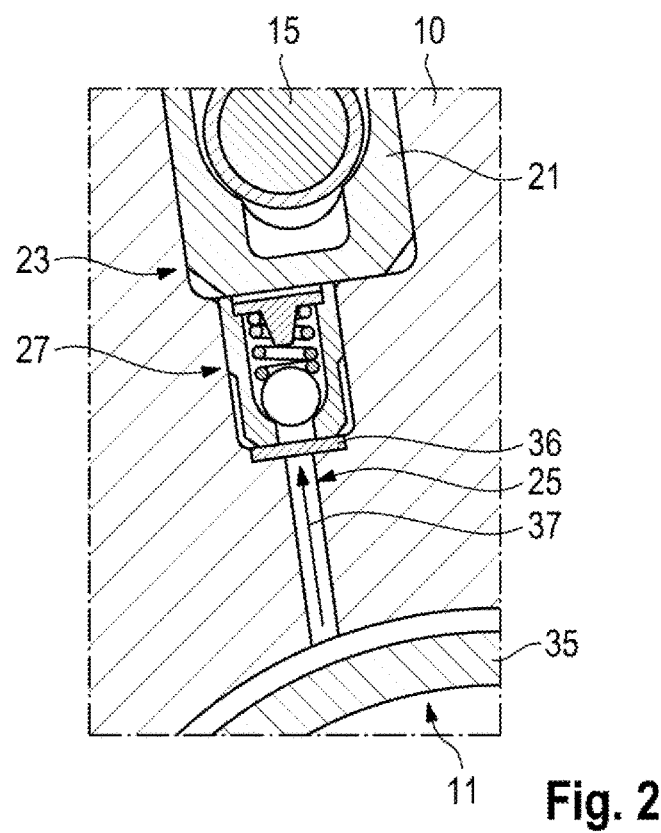
FIG. 2 shows a detail of a first connecting rod according to the invention.

FIG. 2 shows a detail of a connecting rod 10 in the region of a check valve 27 and in the region of a piston 21 that is guided in a hydraulic chamber 23 of an eccentric rod 15. In the exemplary embodiment of FIG. 2, each check valve 27 has a filter element 36 that is integrated with the check valve 27 into the hydraulic chamber 23 upstream of the check valve 27 as viewed in the flow direction 37 of the hydraulic oil.

In FIG. 2, the filter element 36 is a plate-like filter element in the form of a separate assembly and is pressed into the hydraulic chamber 23 before the arrangement of the check valve 27 in the hydraulic chamber 23. In contrast to the embodiment of FIG. 2, the filter element 36 may be an integral constituent part of the check valve 27.

It is likewise possible for a filter element to be integrated into the respective hydraulic line 24 and 25 that conducts the hydraulic oil in the direction of the respective hydraulic chambers 22, 23 from the crankpin bearing eye 11.

Figure 3:
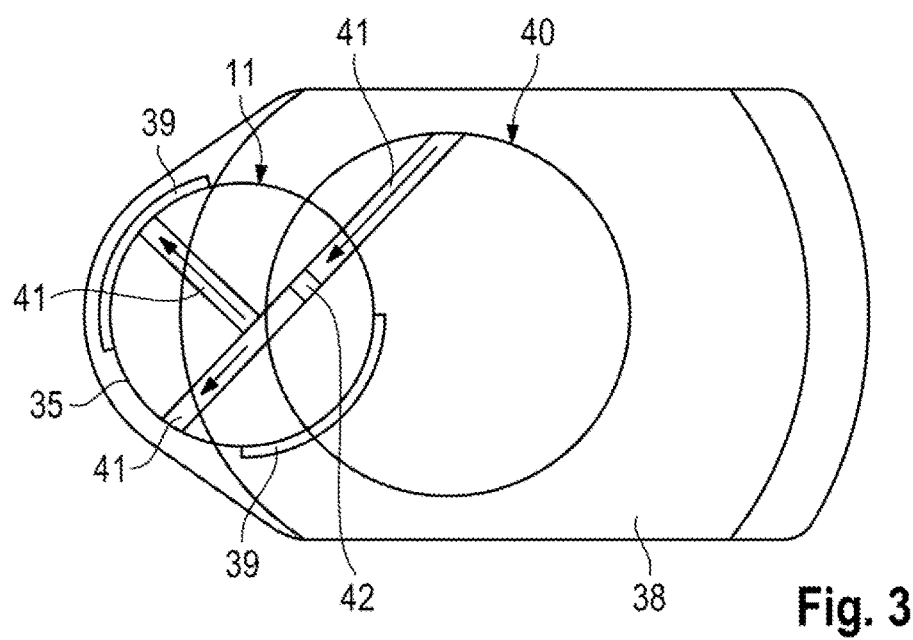
FIG. 3 shows a detail of a second connecting rod according to the invention.

FIG. 3 shows a highly schematized detail of an internal combustion engine in the region of a crankshaft 38 and of a connecting rod 10, and shows the crankpin bearing eye 11 of the connecting rod 10 and oil-guiding grooves 39 in the region of the crankpin bearing eye 11 or in the region of the connecting rod bearing shell 35.

FIG. 3 shows a main bearing journal 40 and hydraulic lines 41 integrated into the crankshaft 38. The hydraulic lines 41 conduct hydraulic oil from the crankshaft 38 in the direction of the oil-guiding grooves 39 in the region of the crankpin bearing eye 11. A filter element 42 is integrated into one of the hydraulic lines 41 of the crankshaft 38 so that no contaminants can pass in the direction of the connecting rod 10 via the hydraulic oil.

In accordance with the invention, contaminants such as dirt or chips that may be contained in the hydraulic oil of an engine oil circuit, can be filtered out by filter elements assigned to connecting rods 10 to prevent such contaminants from passing into the region of hydraulic chambers 22, 23 or check valves 26, 27 of an eccentric adjustment device 13 of the connecting rods 10 and thereby being able to impair the functionality of the respective connecting rod 10. In FIG. 2, each hydraulic chamber 22, 23, or each check valve 26, 27 has a separate filter element 36 integrated into the respective connecting rod 10. In the variant of FIG. 3, a filter element 42 is integrated into a hydraulic line 41 of the crankshaft 38 and interacts with each connecting rod 10. The filter elements 36, 42 of FIGS. 2 and 3 may also be used in combination with one another. Thus, it is possible to prevent contaminants from passing in the direction of the connecting rod 10 via the hydraulic oil. In this way, internal combustion engines that have low cleanliness requirements with regard to the engine oil circuit can be equipped with connecting rods 10 that have an eccentric adjustment device 13 for varying the effective connecting rod length.

What is claimed is:

1. A connecting rod, comprising: a crankpin bearing eye for attaching the connecting rod to a crankshaft, a connecting-rod bearing eye for attaching the connecting rod to a piston of a cylinder, and an eccentric adjustment device for adjusting an effective connecting rod length, the eccentric adjustment device having eccentric rods that engage on an eccentric lever of the eccentric adjustment device, each eccentric rod having a piston guided in a hydraulic chamber of the connecting rod, the hydraulic chambers in which the pistons are guided being charged with hydraulic oil from first hydraulic lines that are integrated into the crankshaft and that lead to the crankpin bearing eye and second hydraulic oil lines that lead away from the crankpin bearing eye, check valves preventing a backflow of the hydraulic oil from the hydraulic chambers back into the second hydraulic lines, and at least one filter element disposed for preventing an ingress of contaminants into the hydraulic chambers from the crankshaft via the hydraulic oil, wherein the at least one filter element comprises filter elements assigned respectively to each of the check valves.

2. The connecting rod of claim 1, wherein the at least one filter element is integrated into a first hydraulic line of the crankshaft.

3. The connecting rod of claim 2, wherein the at least one filter element comprises a connecting rod filter element incorporated into the first hydraulic lines of the crankshaft.

4. The connecting rod of claim 1, wherein the filter elements are integrated respectively into each of the hydraulic chambers of the connecting rod.

5. The connecting rod of claim 1, wherein each respective filter element is an integral constituent part of the respective check valve.

6. The connecting rod of claim 1, wherein the filter element are integrated respectively into the second hydraulic lines of the connecting rod.

7. An internal combustion engine that has an adjustable compression ratio, at least one cylinder and a crankshaft on which at least one connecting rod engages, the connecting rod having a crankpin bearing eye for attachment to the crankshaft, a connecting-rod bearing eye attachment of said connecting rod to a piston of the cylinder, and an eccentric adjustment device for adjusting an effective connecting rod length, the eccentric adjustment device having an eccentric that interacts with an eccentric lever, each eccentric rod having a piston guided in a hydraulic chamber of the connecting rod, the hydraulic chambers in which the pistons are guided being charged with hydraulic oil from first hydraulic lines that are integrated into the crankshaft and that lead to the crankpin bearing eye and second hydraulic oil lines that lead away from the crankpin bearing eye, check valves preventing a backflow of the hydraulic oil from the hydraulic chambers back into the second hydraulic lines, and at least one filter element disposed preventing an ingress of contaminants into the hydraulic chambers from the crankshaft via the hydraulic oil, wherein the at least one filter element comprises filter elements assigned respectively to each of the check valves.

\* \* \* \* \*